Figure 1:
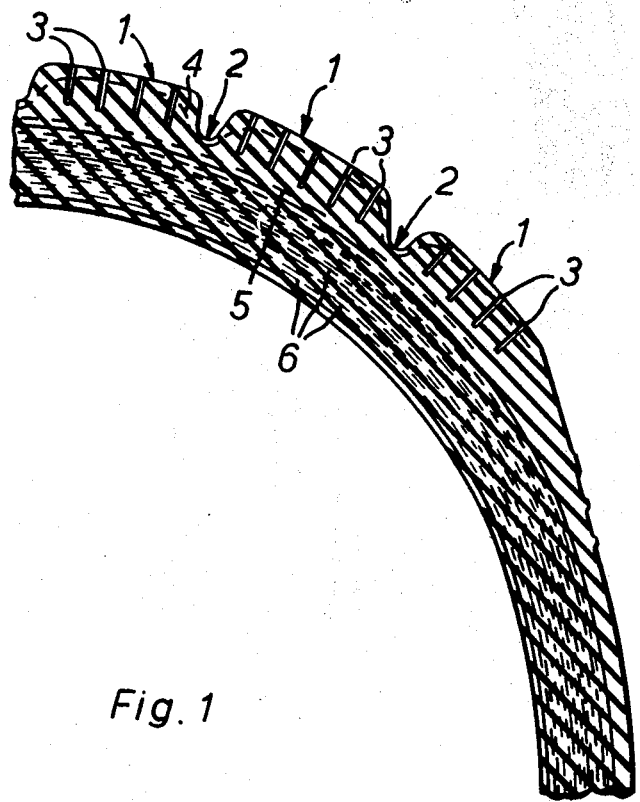

United States Patent

[11] 3,543,827

| [72] | Inventors | Glyn B. Roberts<br>Four Oaks, Sutton Coldfield;<br>Thomas Holmes, Walmley, Sutton Coldfield, England |
|---|---|---|
| [21] | Appl. No. | 726,692 |
| [22] | Filed | May 6, 1968 |
| [45] | Patented | Dec. 1, 1970 |
| [73] | Assignee | The Dunlop Company Limited<br>London, England<br>a British company |
| [32] | Priority | May 19, 1967 |
| [33] | | Great Britain |
| [31] | | No. 23353/67 |

[54] PNEUMATIC TIRES
9 Claims, 2 Drawing Figs.

[52] U.S. Cl. .................................................. 152/209
[51] Int. Cl. ..................................................... B60c 11/06, B60c 11/10

[50] Field of Search........................................... 152/361, 209

[56] References Cited
UNITED STATES PATENTS

| 3,185,199 | 5/1965 | Klingemann ................. | 152/209 |
| 3,225,812 | 12/1965 | Barrett.......................... | 152/361 |
| 3,409,064 | 11/1968 | Leonard........................ | 152/209 |

*Primary Examiner*—Arthur L. La Point
*Attorney*—Stevens, Davis, Miller and Mosher ABSTRACT: A reinforced tread pneumatic tire provided to reduce or eliminate the tendency to aquaplane by the provision of radially inwardly extending chambers in the ground-contacting surface of the tire which penetrate the tread reinforcement but not the carcass plies or breaker layers of the tire, and tend to act as local reservoirs soaking up water in the tread contact patch, of which the following is a specification.

PNEUMATIC TIRES

This invention relates to reinforced tread pneumatic tires and particularly to reinforced tread aircraft tires. The term "reinforced tread pneumatic tire" will be understood to refer to a tire having one or more layers of rubberised cord reinforcement which are located within the rubber of the tread portion radially outwardly of the radially outermost carcass ply or, where one or more breaker layers are provided, radially outwardly of the radially outermost breaker layer. Where a circumferentially ribbed pattern is provided on the ground-contacting surface of the tread, at least one of the tread reinforcing layers extends radially outwardly into the ribs so that, in axial cross section, the reinforcing layer is of a substantially sinuous configuration.

Aircraft tires, which are subject to high speed, high pressure, and high loading, are often provided with a reinforced tread but such tires, even when provided with a circumferentially ribbed tread pattern, are liable to exhibit the known phenomena of aquaplaning when running at high speed on a water covered runway and it is an object of the invention to provide a reinforced tread tire which will reduce or substantially eliminate the tendency to aquaplane.

According to the invention there is provided a reinforced tread tire having a tread portion with at least one tread reinforcement layer contained therein wherein at least part of the ground-contacting surface thereof is provided with a plurality of spaced-apart water-receiving chambers opening at said surface and extending generally radially inwardly therefrom to terminate radially outwardly of the radially outermost carcass ply or breaker layer and to extend radially inwardly from said surface through at least one tread reinforcement layer.

Preferably the ground-contacting surface of the tread portion of the tire is provided with a plurality of generally circumferentially extending ribs and a plurality of generally circumferential grooves with at least one of the reinforcing layers extending radially outwardly into one or more of the said ribs, the chambers being provided in at least one of the ribs and said chambers preferably extending radially inwardly from the ground-contacting surface of the ribs to penetrate a reinforcing layer and to a depth which is substantially equal to the depth of said grooves. Alternatively, the radial depth of the chambers may be less or more than the depth of the grooves providing that said radial depth is sufficient to extend through at least one cord reinforcement layer.

The chambers may be circular in transverse cross section and each chamber may be of a diameter lying within the range of 0.02 to 0.100 inches and the depth to diameter ratio of each chamber may lie within the range of 4:1 to 20:1.

Alternatively the chambers may be partially at least of tapered form being divergent in a direction radially inwardly from the tread ground-contacting surface and each chamber may be formed with a base of bulbous or other enlarged cross-sectional form.

Figure 2:
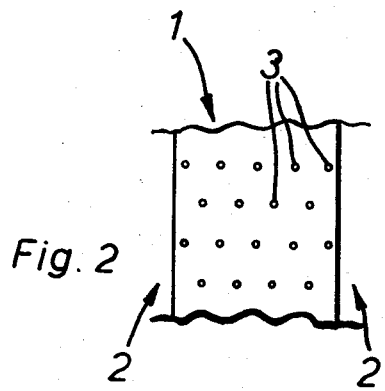

One embodiment of the invention will now be described in more detail with reference to the accompanying drawings wherein:

FIG. 1 shows an axial cross-sectional part view through a tire according to an embodiment of the invention, showing the disposition of the cylindrical recesses in the tire tread and their relationship to the tread reinforcement, FIG. 2 is a plan view of a rib of the tire shown in FIG. 1 to the same scale showing the spatial relationship of the cylindrical recesses.

In an embodiment of the invention a reinforced tread aircraft tire is of open-bellied form and is manufactured in a conventional manner utilizing 12 carcass plies 6 and one reinforcement layer 4 in the tread portion. The reinforcement layer 4 comprises a plurality of parallel cords disposed at an angle to the midcircumferential plane of the tire which is substantially equal to the carcass ply cord angle, such angle being of the order of 35°. The tire is also provided with a breaker layer 5 disposed outwardly of th said carcass plies 6. The ground-contacting surface of the tread portion of the tire is provided with six generally circumferentially extending ribs 1 and five generally circumferentially extending grooves 2 moulded into the tread portion during vulcanisation of the tire.

Each rib is provided with a plurality of water receiving chambers 8 in the form of cylindrical recesses 3 which are open at the ground-contacting surface of the ribs 1 and extend radially inwardly therefrom through the tread reinforcement layer 4 to terminate radially outwardly of the breaker layer 5.

Each of the said cylindrical recesses 3 is 0.04 inches in diameter and is approximately 0.3 inches in depth measured from the ground-contacting surface of the tread.

The said cylindrical recesses 3 are uniformly distributed over the ground-contacting surface of the tire tread ribs 1 and are arranged in rows extending generally circumferentially, the rows in each rib being spaced 0.25 inches apart, and as shown in FIG. 2, the cylindrical recesses in each row within a rib are circumferentially offset with respect to those in the adjacent rows.

In a modification of the said embodiment (not shown) the cylindrical recesses 3 are replaced by moulded chambers which are of a partially tapered form and which diverge in a direction radially inwardly of the tire from the ground-contacting surface of the ribs.

The moulding of such chambers in the tread portion of a reinforced tread tire does not present difficulty since the moulding pins utilized to mould the chambers are of a small cross-sectional dimension and can easily penetrate in between the cords of the reinforcing layers which extend radially outwardly into the ribs of the tire. This relative simplicity of moulding, together with the fact that no damage is likely to be incurred by the tread reinforcing layers during moulding, is in marked contrast to proposed tire constructions wherein slots or knife cuts moulded in the tread portion have caused cutting or radially inward displacement of the tread reinforcement cords, this being due to the fact that such slots or knife cut moulding blades are of a comparatively large length when compared with the cross-sectional dimensions of the moulding pins utilised in producing a tire according to the present invention.

When a tire constructed in accordance with the invention is running upon a water-covered surface, the moulded chambers operate as local reservoirs to soak up the film of water which is left in the path of the rolling tire after the bulk of the water has been removed by the circumferential grooves and the bow-wave effect of the tire. The water-receiving capacity of the chambers si is such that the effective contact area of the tire is not further reduced and is adequate to reduce or substantially eliminate the aquaplaning phenomenon.

We claim:

1. A reinforced tread pneumatic tire comprising a tread portion, at least one tread reinforcement layer contained therein and at least one generally circumferentially extending groove in said tread portion, at least part of the ground-contacting surfaces of the tread being provided with a plurality of spaced apart water-receiving chambers open at said surface and extending generally radially inwardly therefrom to terminate radially outwardly of the radially outermost breaker layer and to extend radially inwardly from said surface through at least one tread-reinforcing layer, the chambers having;

a diameter in the range 0.01 inches to 0.1 inches; and a depth to diameter ratio in the range 20:1 to 4:1.

2. A pneumatic tire according to claim 1 wherein the ground-contacting surface of the tread portion of the tire is provided with a plurality of generally circumferentially extending ribs and grooves.

3. A pneumatic tire according to claim 2 wherein at least one tread reinforcing layer extends radially outwardly into at least one of the said ribs.

4. A pneumatic tire according to claim 3 wherein the radial depth of the said chambers is substantially equal to that of the generally circumferential grooves.

5 A pneumatic tire according to claim 1 wherein all of the ribs are provided with a plurality of said chambers.

6. A pneumatic tire according to claim 1 wherein the longitudinal axes of said chambers are disposed in a radial sense.

7. A pneumatic tire according to claim 1 wherein the said chambers are of circular form in transverse cross section.

8. A pneumatic tire according to claim 12 wherein the said chambers are of tapered form diverging radially inwardly of the ground-contacting surface of the tire.

9. A pneumatic tire according to claim 1 wherein some at least of said chambers are provided with enlarged base portions.